[## United States Patent
Vijayvargiya (12) United States Patent
(10) Patent No.: US 12,334,771 B2
(45) Date of Patent: Jun. 17, 2025

(54) CIRCUIT FAILURE PROTECTION

(71) Applicant: Western Digital Technologies, Inc., San Jose, CA (US)

(72) Inventor: Amit Vijayvargiya, Karnataka (IN)

(73) Assignee: SANDISK TECHNOLOGIES, INC., Milpitas, CA (US)

(*) Notice: Subject to any disclaimer, the term of this patent is extended or adjusted under 35 U.S.C. 154(b) by 16 days.

(21) Appl. No.: 18/349,101

(22) Filed: Jul. 7, 2023

(65) Prior Publication Data
US 2024/0186818 A1 Jun. 6, 2024

Related U.S. Application Data

(60) Provisional application No. 63/385,866, filed on Dec. 2, 2022.

(51) Int. Cl.
*H02J 9/06* (2006.01)
*G06F 1/26* (2006.01)
*H02J 7/34* (2006.01)

(52) U.S. Cl.
CPC ............... *H02J 9/06* (2013.01); *G06F 1/26* (2013.01); *H02J 7/345* (2013.01)

(58) Field of Classification Search
CPC ........................................................ H02J 9/06
USPC ............................................................. 307/66
See application file for complete search history.

(56) References Cited

U.S. PATENT DOCUMENTS

| | | | |
|---|---|---|---|
| 9,143,005 B1 | 9/2015 | Laird et al. | |
| 10,516,263 B2 | 12/2019 | Nordin et al. | |
| 11,175,713 B2 | 11/2021 | Zupanc et al. | |
| 11,271,387 B2 | 3/2022 | Narita | |
| 2015/0008872 A1* | 1/2015 | Fujimori | H02J 50/001 320/107 |
| 2018/0059761 A1 | 3/2018 | An et al. | |
| 2018/0308527 A1* | 10/2018 | Narayanan | G06F 3/0619 |
| 2022/0122631 A1 | 4/2022 | Lucky et al. | |

* cited by examiner

*Primary Examiner* — Joseph Chang
(74) *Attorney, Agent, or Firm* — ARENTFOX SCHIFF LLP (57) ABSTRACT

Aspects of a storage device including a memory and a controller are provided. In certain aspects, the storage device may include a holdup circuit powered and controlled by the controller. In some examples, the holdup circuit may be configured to charge a first capacitor by closing a first switch coupled between the first capacitor and a boost converter during a first window of time. The holdup circuit may also be configured to charge a second capacitor by closing a second switch coupled between the second capacitor and the boost converter during a second window of time.

16 Claims, 6 Drawing Sheets

CIRCUIT FAILURE PROTECTION

CROSS REFERENCE TO RELATED APPLICATION(S)

This application claims the benefit of U.S. Provisional Application No. 63/385,866, entitled "CIRCUIT FAILURE PROTECTION" and filed on Dec. 2, 2022, the disclosure of which is expressly incorporated by reference herein in its entirety.

BACKGROUND

Field

This disclosure is generally related to electronic devices and more particularly to integrated circuits and circuit failure protection.

INTRODUCTION

Computer systems may include one or more different types of resources for storing data. Examples of data storage resources include hard drives, optical disks, non-volatile memory chips, volatile memory chips, etc.

In certain instances, access to data in a storage resource in a computer system requires that the corresponding storage resource be powered. For example, in order to write data to or read data from a non-volatile memory chip, the non-volatile memory device must be receiving input power.

It is known that computer systems and corresponding data storage resources are susceptible to power outages. For example, a primary power source used to power a respective computer may fail at any time due to an electrical/mechanical failure of the primary power source, or a regional power outage. Performing an input/output (I/O) operation (e.g., read/write/erase) on a non-volatile memory device during a power failure condition can result in corruption of data stored on the memory device.

Computer systems typically include volatile memory resources such as cache or dynamic RAM (random access memory) to store often-accessed data. In certain instances, the computer system also includes non-volatile memory to store important data that is to be retained even during shut down of the computer system. If data in the volatile memory device is not stored to a non-volatile memory device prior to shut down of the computer system, the data will be lost.

To avoid corruption or loss of data as a result of a power failure, computer systems typically include a bank of holdup capacitors to store energy. When a power failure condition is detected, a power supply in the computer system reverts to using the energy stored in the bank of holdup capacitors (instead of using main power because it is no longer available) to continue to power the computer system during the power failure so that any final writes of data to the non-volatile memory can occur.

SUMMARY

Aspects are directed to a holdup circuit. In some examples, the holdup circuit includes a boost converter, a semiconductor device configured to output a first signal and a second signal, a first capacitor coupled to the boost converter via a first switch, and a second capacitor coupled to the boost converter via a second switch. In some examples, the first switch is controlled by the first signal, the second switch is controlled by the second signal, and the first signal is complementary to the second signal.

Aspects are directed to a method for providing auxiliary power to a circuit. In some examples, the method includes controlling a first switch by the first signal, and controlling a second switch by a second signal. In some examples, the first signal is complementary to the second signal. In some examples, a first capacitor coupled to the boost converter via a first switch, and a second capacitor coupled to the boost converter via a second switch.

Aspects are directed to an apparatus for providing auxiliary power to a circuit. In some examples, the apparatus includes means for controlling a first switch by the first signal, and means for controlling a second switch by a second signal. In some examples, the first signal is complementary to the second signal. In some examples, a first capacitor coupled to the boost converter via a first switch, and a second capacitor coupled to the boost converter via a second switch.

Aspects are directed to a non-transitory computer-readable medium comprising instructions that, when executed by an apparatus, cause the apparatus to perform an operation. In some examples, the operation includes controlling a first switch by the first signal, and controlling a second switch by a second signal. In some examples, the first signal is complementary to the second signal. In some examples, a first capacitor coupled to the boost converter via a first switch, and a second capacitor coupled to the boost converter via a second switch.

Aspects are directed to a method for providing auxiliary power to a circuit. In some examples, the method includes charging a first capacitor of a holdup capacitor bank during a first window of time. In some examples, the method includes charging a second capacitor of the holdup capacitor bank during a second window of time, wherein the second window of time occurs after the first window of time.

Aspects are directed to an apparatus configured to provide auxiliary power to a circuit. In some examples, the apparatus is configured to charge a first capacitor of a holdup capacitor bank during a first window of time. In some examples, the apparatus is configured to charge a second capacitor of the holdup capacitor bank during a second window of time, wherein the second window of time occurs after the first window of time.

Aspects are directed to an apparatus for providing auxiliary power to a circuit. In some examples, the apparatus includes means for charging a first capacitor of a holdup capacitor bank during a first window of time. In some examples, the apparatus includes means for charging a second capacitor of the holdup capacitor bank during a second window of time, wherein the second window of time occurs after the first window of time.

Aspects are directed to a non-transitory computer-readable medium comprising instructions that, when executed by an apparatus, cause the apparatus to perform an operation. In some examples, the operation includes charging a first capacitor of a holdup capacitor bank during a first window of time. In some examples, the operation includes charging a second capacitor of the holdup capacitor bank during a second window of time, wherein the second window of time occurs after the first window of time.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host will be presented. These aspects are well suited for flash storage devices, such as SSDs, USB and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Figure 1:
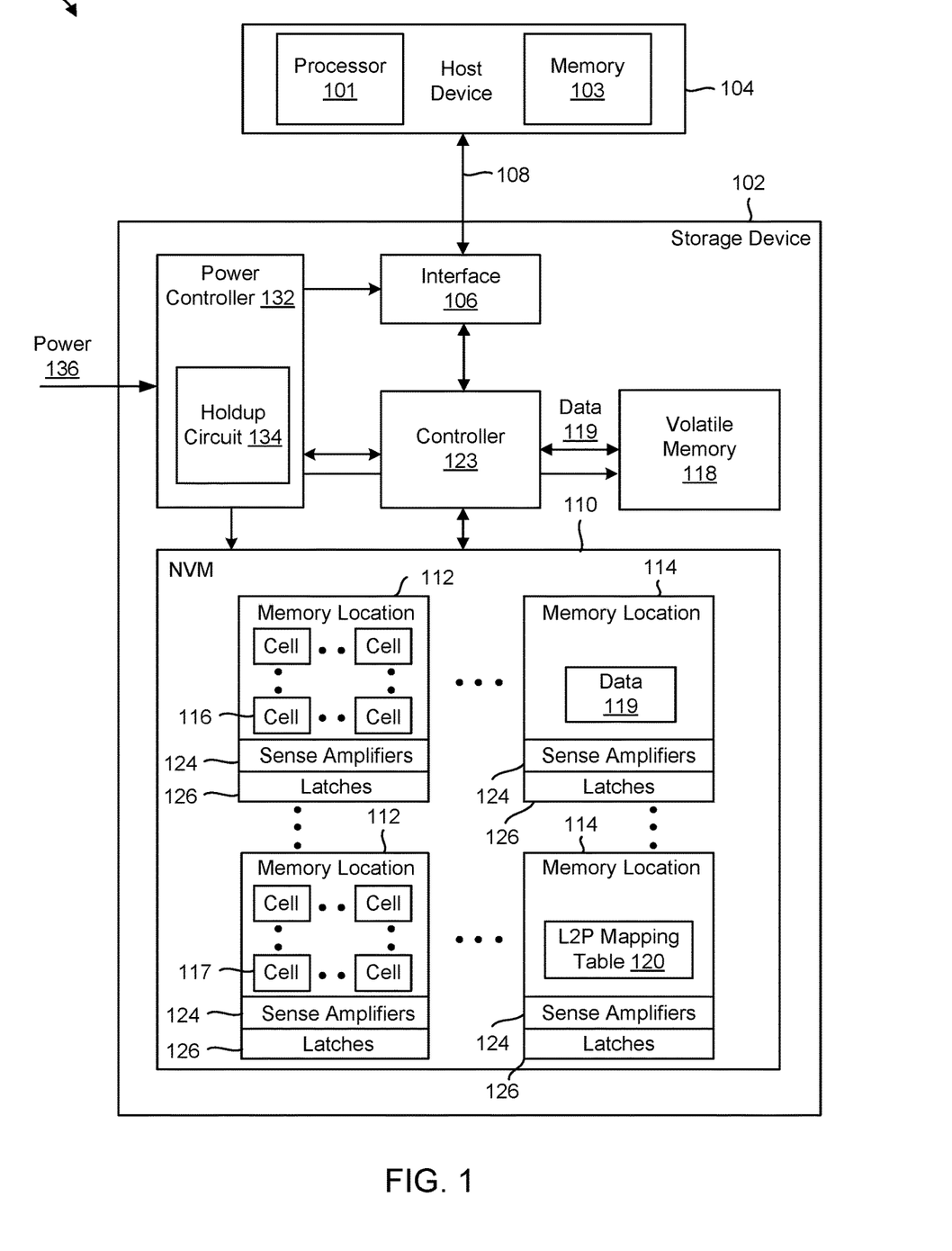
FIG. 1 is an exemplary block diagram illustrating a storage device which communicates with a host device.

FIG. 1 shows an exemplary computing system 100 including a storage device 102 which communicates with a host device 104 (also "host") according to an exemplary embodiment. The host 104 and the storage device 102 may form the computing system 100, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. At least one processor 101 may include any form of hardware capable of processing data and may include a general-purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magneto-resistive random-access memory (MRAM) devices, ferroelectric random-access memory (F-RAM), and any other type of non-volatile memory devices. In other examples, the host memory 103 may include volatile memory, such as random-access memory (RAM), dynamic random-access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as serial advanced technology attachment (SATA), PCI express (PCIe), small computer system interface (SCSI), or serial attached SCSI (SAS), among other possible candidates. Alternatively, the host interface 106 may be wireless, and may interface the storage device 102 with the host 104 using, for example, cellular communication (e.g., 5G NR, 4G LTE, 3G, 2G, GSM/UMTS, CDMA One/CDMA2000, etc.), wireless distribution methods through access points (e.g., IEEE 802.11, WiFi, HiperLAN, etc.), infrared (IR), Bluetooth, Zigbee, or other wireless wide area network (WWAN), wireless local area network (WLAN), wireless personal area network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., SLC memory, MLC memory, TLC memory, QLC memory, PLC memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a dynamic random-access memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g., NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

The storage device 102 also includes a power controller 132 configured to receive input power 136 from an external source and provide power to the storage device. The power controller 132 includes circuitry to selectively provide power to any of the elements of storage device 102. The power controller 132 can receive control instructions from the processor 101 via the interface 106 and/or the controller 123. Holdup circuit 134 includes energy storage devices for storing power received from the power source for use during power interruption events, such as loss of source power. The holdup circuit 134 can include capacitance storage devices, such as an array of capacitors. Further discussion of examples of power control circuitry is found below.

Many digital storage devices (e.g., flash drives) may include a holdup circuit 134 that comprises multiple holdup capacitors. The capacitors may be charged during normal operation, and their energy used in case of input power 136 failure. Holdup capacitors are typically around 18-47 uF, and provide the device 102 with continued power for a duration of time (e.g., ~10-30 ms depending on the form factor, capacitor size, and how many holdup capacitors are used by the device 102) after the input power 136 failure to allow the device to complete an input/output (I/O) command. For example, if the device 102 loses its input power 136 during a write command, the holdup capacitor may provide the device 102 with enough power to complete the write command (e.g., write all the data in a cache to the NAND). Without the holdup capacitor, data may become corrupted or otherwise lost.

Certain techniques may be used to increase the duration of time (e.g., holdup time) during which the device is still operational after input power 136 failure. For example, while the device 102 still has input power, the holdup capacitors may be charged by a boost converter circuit (e.g., part of the holdup circuit 134) using a higher voltage (e.g., 28-35V, etc.) relative to other circuit components in the device 102. Thus, if there is an input power failure, the charged holdup capacitors may be used to provide power to a buck converter (e.g., part of the holdup circuit 134) that can continue to power the device for a duration of time in order to complete I/O operations. In other words, the holdup capacitor may provide backup power for a duration of time after input power failure.

Figure 2:
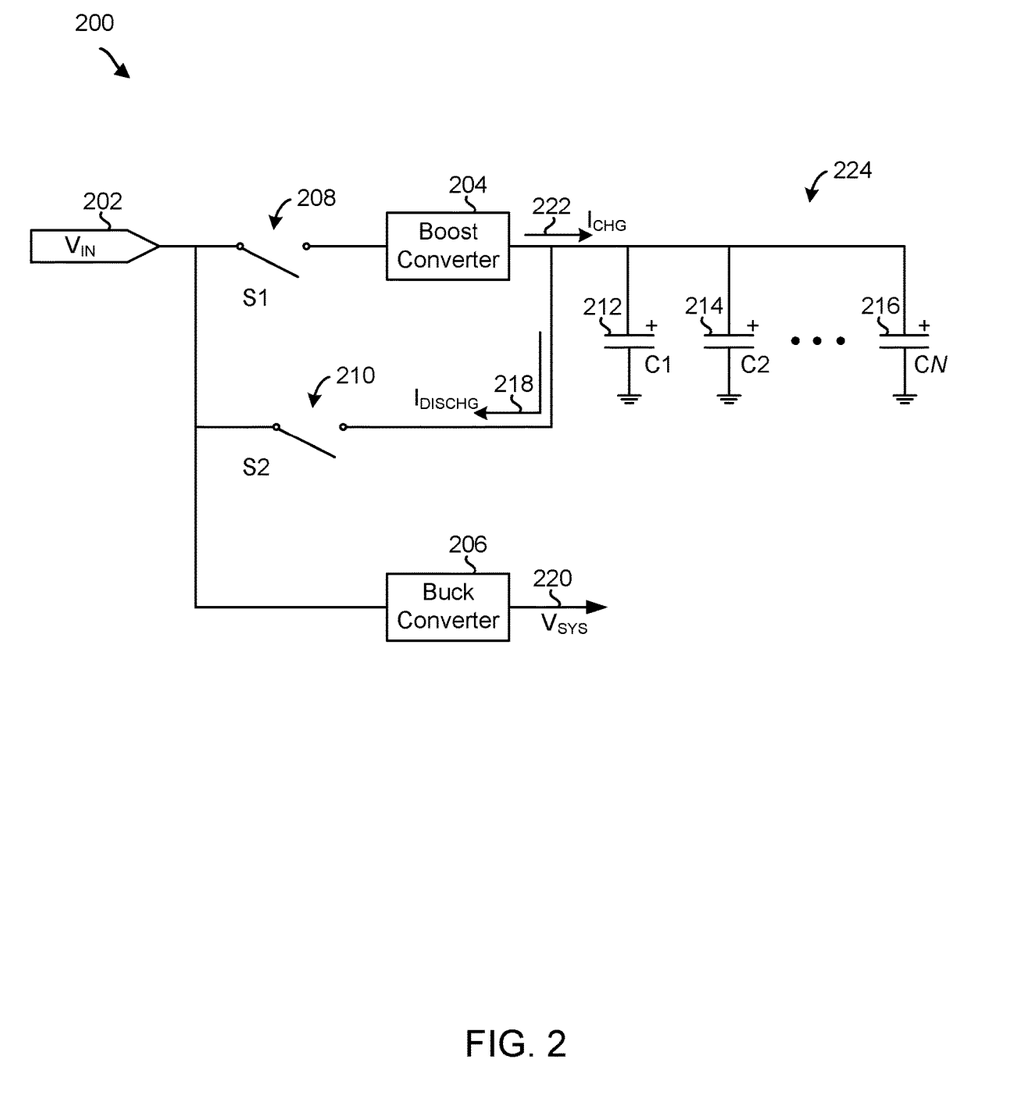
FIG. 2 is a schematic diagram illustrating an example holdup circuit for holdup power function in a storage device.

FIG. 2 is a schematic diagram illustrating an example holdup circuit 200 for holdup power function in a storage device (e.g., storage device 102). In this example, power is supplied to the circuit 200 via an input voltage 202 (e.g., provided by power controller 132 of FIG. 1). There are two switches coupled between the input voltage 202 and a capacitor bank 224: a first switch (S1) 208 and a second switch (S2) 210. The capacitor bank 224 may include multiple capacitors, for example two or more capacitors. In the illustrated example, the bank includes N capacitors: a first capacitor (C1) 212, a second capacitor (C2) 214, and an Nth capacitor (CN) 216.

During normal operation of a storage device, the first switch 208 may be closed to allow a boost converter 204 to charge the capacitors in the capacitor bank 224. The boost converter 204 may be configured to generate an output voltage to the capacitor bank 224 that is higher than its input voltage.

If the storage device loses its input power, then the second switch 210 may close and a discharge current 218 may drain from the energized capacitor bank 224 into a buck converter 206. In some examples, a buck converter may operate as a voltage step-down and current step-up converter. The simplest way to reduce a voltage of a DC supply is to use a linear regulator. However, linear regulators typically waste energy as they operate by dissipating excess power as heat. On the other hand, buck converters can be relatively efficient (e.g., 95% or higher for integrated circuits), and as such may be useful for various applications, such as converting a relatively high voltage from a holdup capacitor bank 224 down to a system voltage 220 level appropriate for use by a processor (e.g., 0.8-1.8V, etc.) and/or other integrated circuits of the storage device. Thus, the buck converter 206 may be configured to scale down power/voltage it receives from the capacitor bank 224 so that the system is not overwhelmed.

In some examples, a holdup capacitor may be implemented as a tantalum capacitor. Because of its relatively thin form factor and relatively high permittivity dielectric layer, the tantalum capacitor distinguishes itself from other conventional and electrolytic capacitors by its high capacitance per volume (high volumetric efficiency) and lower weight. Thus, tantalum capacitors offer a relatively high capacitance at a reduced size. However, tantalum capacitors are more prone to short circuit failures relative to other types of capacitors.

Moreover, as illustrated in FIG. 2, many holdup capacitor arrangements use multiple capacitors in parallel with each other to support redundancy. As illustrated, each of the capacitors share a common node with the boost converter 204. In such an arrangement, if any of the capacitors experience a short circuit failure, then the remaining capacitors cannot be charged because of the short will prevent the boost converter from charging the other capacitors. That is, if the first capacitor 212 experiences a short circuit failure, then the charging current 222 provided by the boost converter will pass entirely though the first capacitor, with no current flowing to the other capacitors. Thus, none of the holdup capacitors will be charged due to the failure of one, and there will be no backup power available from the capacitor band 224 in the event of an input power failure.

Example Functional Protection of a Holdup Circuit

Figure 3:
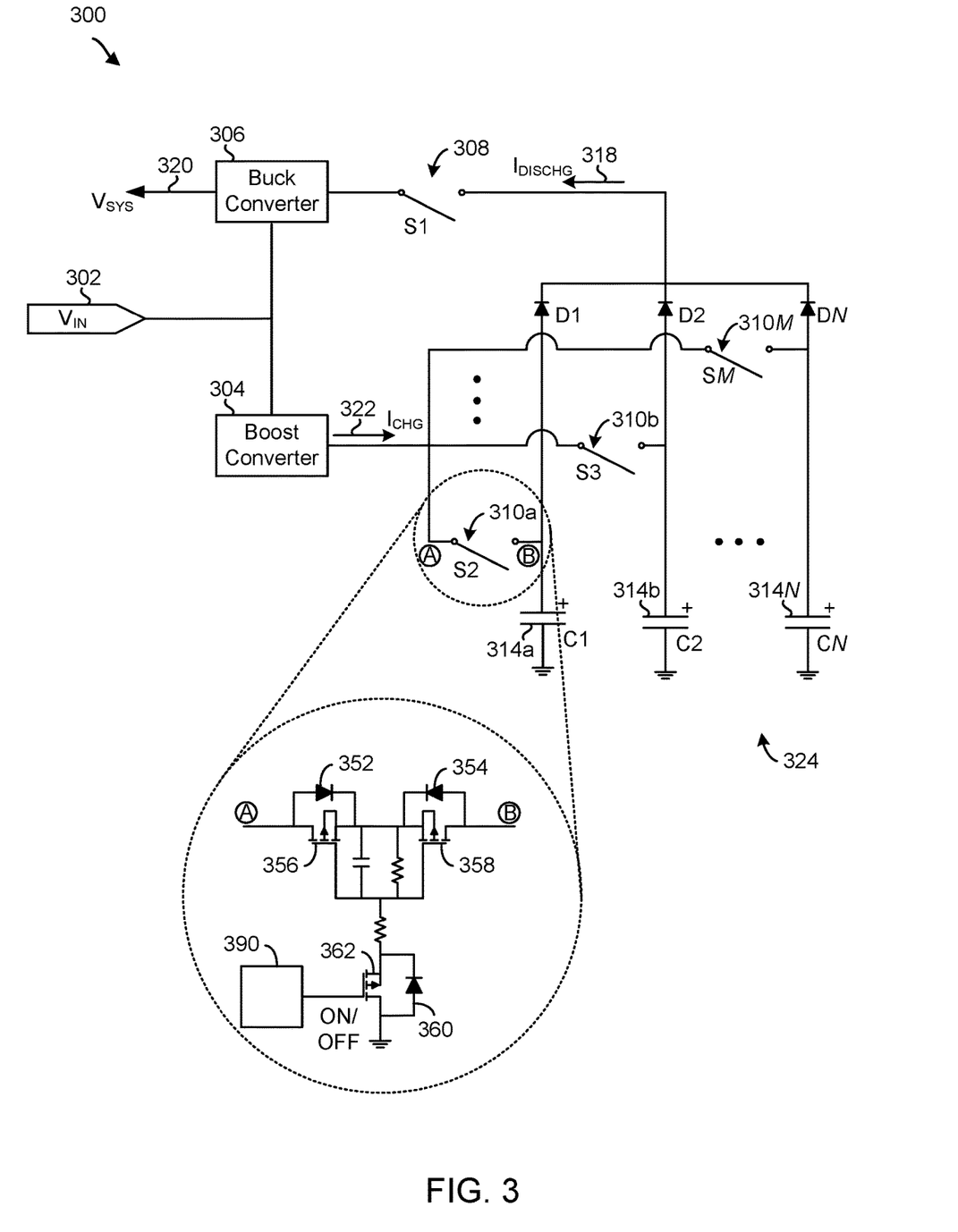
FIG. 3 is a schematic diagram illustrating an example holdup circuit.

FIG. 3 is a schematic diagram illustrating an example holdup circuit 300 (e.g., holdup circuit 134 of FIG. 1). In this example, power is supplied to the circuit 300 via an input voltage 302 (e.g., provided by power controller 132 of FIG. 1). The circuit 300 includes multiple switches (e.g., M switches) coupling each capacitor to a boost converter 304 and a buck converter 306. A first switch (S1) 308 couples each capacitor in a capacitor bank 324 to the buck converter 306. The capacitor bank 324 includes additional switches, with a switch dedicated to each capacitor individually. For example, a second switch (S2) 310a couples the boost converter 304 to a first capacitor (C1) 314a, a third switch (S3) 310b couples the boost converter 304 to a second capacitor (C2) 314b, and a Mth switch (SM) 310M couples the boost converter 304 to an Nth capacitor (CN) 314N. The circuit 300 may include a diode (e.g., D1, D2, DN) between each capacitor and the first switch 308. It should be noted that the three capacitors and four switches illustrated in FIG. 3 are for illustrative and exemplary purposes, and any suitable number of capacitors and switches may be used. For example, the circuit 300 may include only two capacitors and three switches, or any number of additional capacitors and corresponding switches.

Thus, in operation, the holdup circuit 300 may receive input voltage 302 that it uses to charge the capacitors of the capacitor bank 324 via the boost converter 304. For example, the boost converter may pass a charging current ($I_{CHG}$) 322 to each capacitor individually. In one example, only one of the second switch 310a, third switch 310b, and Mth switch 310M is closed at any given time. Thus, only one of the capacitors is charged at a time. For example, if the second switch 310a is closed, then the first switch 308, the third switch 310b, and the Mth switch 310M may be open. Accordingly, with the second switch 310a closed, the first capacitor 314a is charged. Diodes D2 and DN may prevent the charging current 322 from passing to the second capacitor 314b and the Nth capacitor 314N.

Each of the switches in the capacitor bank (e.g., the second switch 310a, third switch 310b, and Mth switch 310M) may be implemented as illustrated in the detail of the second switch 310a. In this example, the second switch 310a includes a first MOSFET 356 coupled to a first diode 352, a second MOSFET 358 coupled to a second diode 354, and a third MOSFET 362 coupled to a third diode 360. In some examples, the first MOSFET and the second MOSFET are P-channel, while the third MOSFET is N-channel. The second diode 354 may prevent current from being discharged through a shorted capacitor (e.g., second capacitor 314b). The first diode 352 may prevent another capacitor from being discharged through a faulty capacitor currently being charged. The third MOSFET 362 may be controlled by an ON/OFF signal provided by a semiconductor device 390 (e.g., a signal from a counter IC).

In certain aspects, the holdup circuit 300 includes a semiconductor device configured to output the ON/OFF signal for activating/deactivating the third MOSFET 362. In some examples, the semiconductor device may be an IC configured as a counter or other suitable clock signal or may be an aspect of the controller 123 of FIG. 1.

Figure 4:
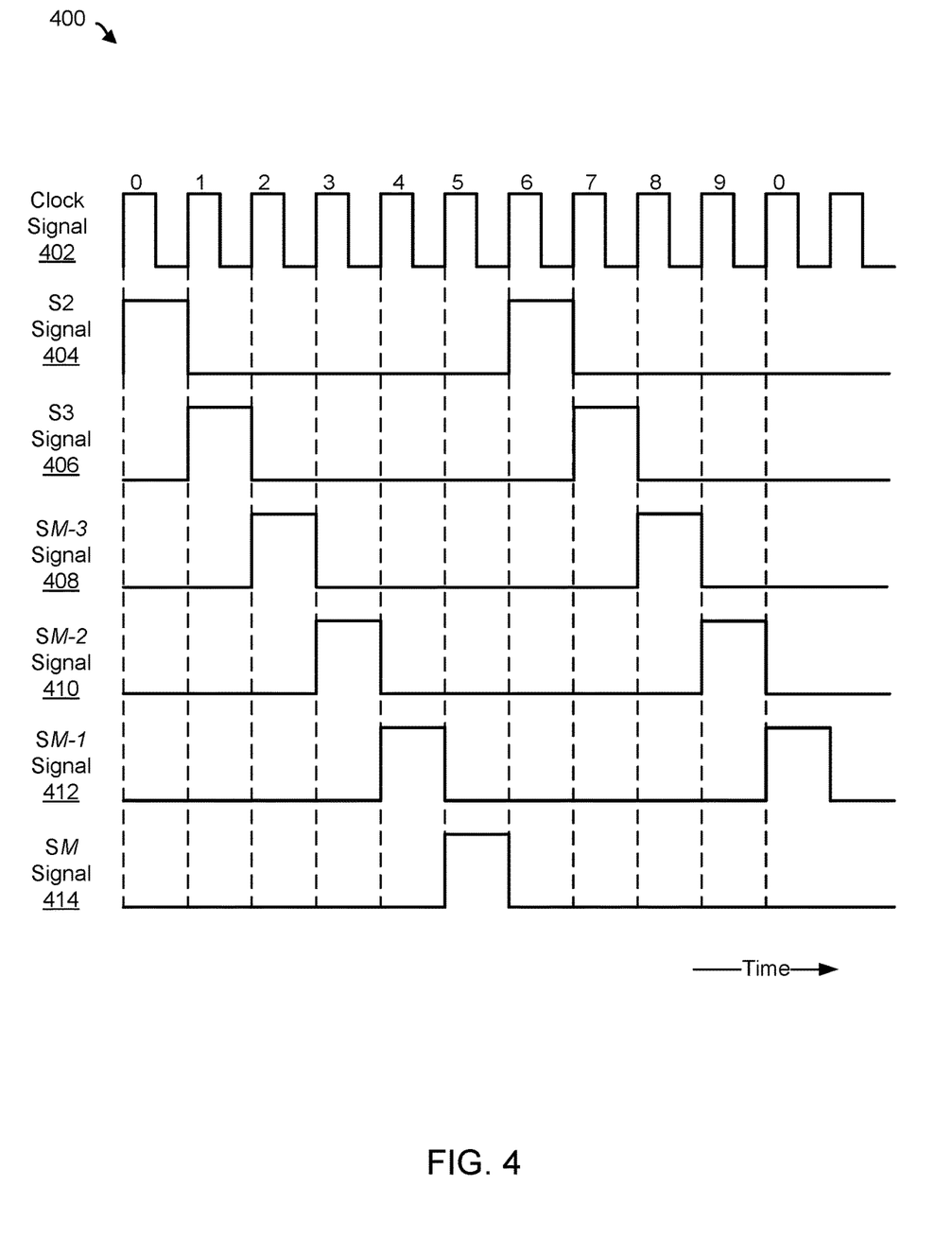
FIG. 4 is a signal wave diagram illustrating example signaling for controlling the holdup circuit of FIG. 3.

FIG. 4 is a signal wave diagram illustrating example signaling 400 for controlling the holdup circuit of FIG. 3. In one example of operation, each of the second switch 310a, the third switch 310b, and the Mth switch 310M may initially be open (e.g., no power is provided to the holdup circuit 300 and gate-to-source voltage is 0V).

Upon power on (e.g., power is supplied to the circuit 300 via the input voltage 302), the semiconductor device may generate or receive a clock signal 402. At a clock signal 0, the semiconductor device may output an S2 signal 404 to the second switch 310a to close the switch. The S2 signal 404 may be configured to remain on for a duration of one or more clock cycles. While the second switch 310a is closed, the boost converter 304 provides energy to the first capacitor 314a for the duration of the one or more clock cycles of the S2 signal 404.

At clock signal 1, the semiconductor device may end the S2 signal 404 (e.g., return the signal to 0V) and begin outputting S3 signal 406 to close the third switch 310b and charge the second capacitor 314b. Again, while the third switch 310b is closed, the boost converter 304 provides energy to the second capacitor 314b for the duration of the one or more clock cycles of the S3 signal 406. The duration of the signal on time may be the same for each switch.

Over time, the semiconductor device may gradually apply a signal to each switch in the capacitor bank 324 of FIG. 3 (e.g., SM-3 signal 408, SM-2 signal 410, SM-1 signal 412. SM signal 414, in a capacitor bank having six switches for six capacitors). Note that only one switch is closed at a time. Thus, even if a particular capacitor has a shorting fault, no other capacitor is affected by it. Accordingly, by only charging one capacitor at a time, each capacitor is given a current that cannot be diverted by a shorted capacitor.

As illustrated in FIG. 4, each capacitor may be charged within a window of time that lasts for a duration before the semiconductor device ends the charge for one capacitor and begins the charge for another capacitor. As such, the capacitors may be charged incrementally. For example, the first capacitor 314a may be charged from 0V to 5V during its initial charge (e.g., S2 signal 404). Then each capacitor after the first capacitor may be charged from 0V to 5V in order. Thus, at any given point, the switch signal for a capacitor being charged may be complementary to the switch signal of a capacitor that is not being charged.

After the last capacitor has been charged to 5V (e.g., SM signal 414), the semiconductor device may restart at the first capacitor 314a and charge it from 5V to 10V before charging each of the other capacitors to 10V. The cycle of charging may continue until the capacitors have reached a predetermined charge or may continue to ensure the capacitors do not lose their charge. In some examples, the semiconductor device may be a counter integrated circuit (IC).

Figure 5:
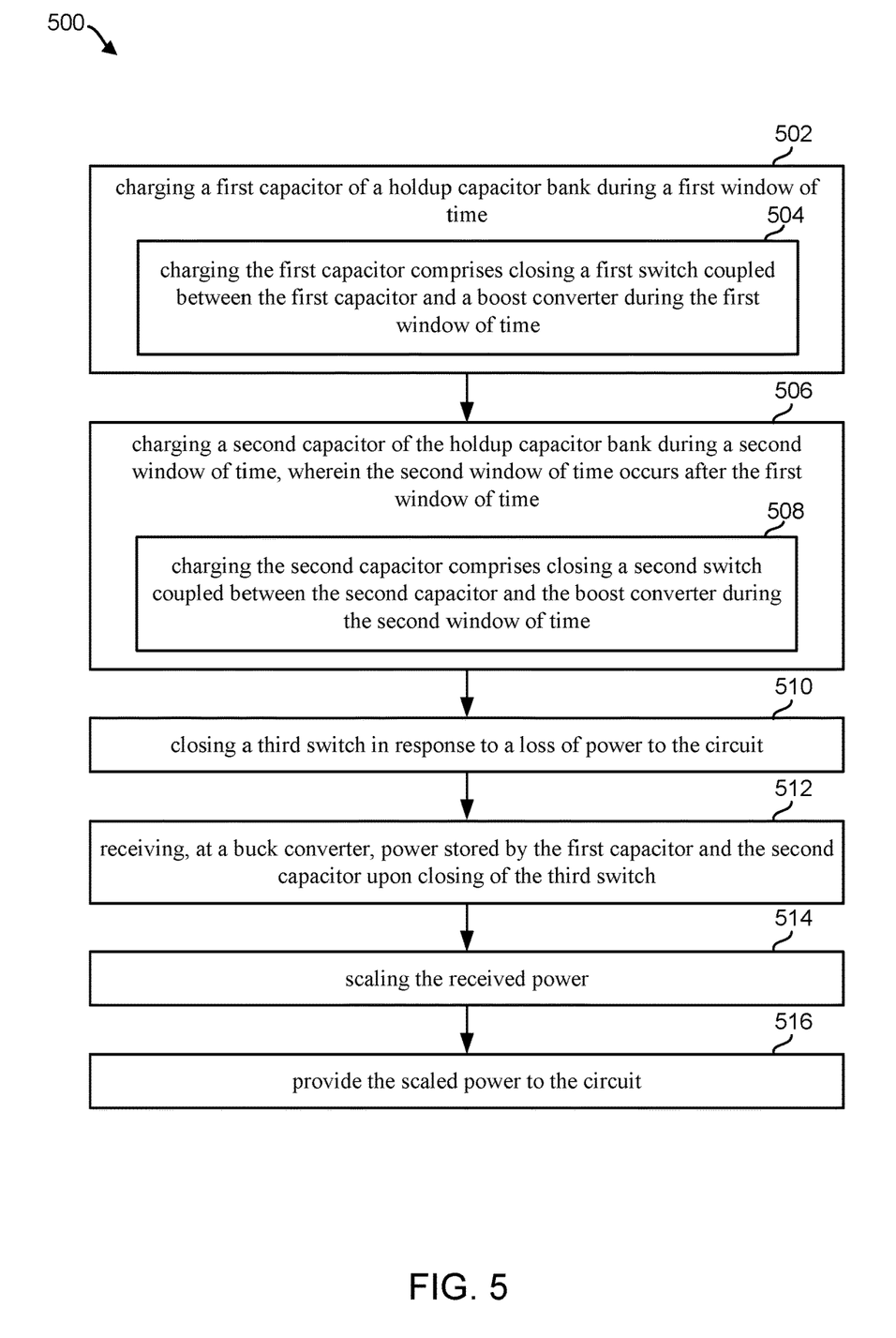
FIG. 5 is a flow diagram illustrating an example method for open block relocation by a storage device.

FIG. 5 is a flow diagram illustrating an example method 500 for providing auxiliary power to a circuit via a holdup circuit (e.g., holdup circuit 134 of FIG. 1, holdup circuit 300 of FIG. 3). At 502, the holdup circuit may charge a first capacitor of a holdup capacitor bank during a first window of time. At 504, charging the first capacitor comprises closing a first switch coupled between the first capacitor and a boost converter during the first window of time. Here, a semiconductor device (e.g., power controller 132 of FIG. 1) may generate a signal (e.g., S2 signal 404 of FIG. 4) configured to close the second switch 310a, thereby allowing the first capacitor 314a to receive a charging current 322 for the duration of time. All other switches in the capacitor bank 324 may remain open. For example, only one switch in the capacitor bank 324 may be closed during a given time window.

At 506, the holdup circuit may charge a second capacitor of the holdup capacitor bank during a second window of time, wherein the second window of time occurs after the first window of time. At 508, charging the second capacitor comprises closing a second switch coupled between the second capacitor and the boost converter during the second window of time. Here, the second switch may correspond to the third switch 310b of the capacitor bank 324 used to charge the second capacitor 314b.

At 510, the holdup circuit may close a third switch in response to a loss of power to the circuit. For example, a input voltage 302 that stops providing power may be a triggering event that causes the first switch 308 of FIG. 3 to close, thereby allowing each of the capacitors in the capacitor bank 324 to power the buck converter 306, which may scale the received power and provide the scaled power to a system. For example, the system may be a storage device, and the scaled power may provide the storage device with enough power to complete a digital storage task (e.g., read/write/erase) before the storage device loses all power and shuts down.

At 512, the holdup circuit may receive, at a buck converter, power stored by the first capacitor and the second capacitor upon closing of the third switch.

At 514, the holdup circuit may scale the received power (e.g., scaling done by the buck converter).

At 516, the holdup circuit may provide the scaled power to the circuit. For example, the scaled power may be provided to a storage device to complete a memory command.

In certain aspects, the second switch is open during the first window of time, and the first switch is open during the second window of time.

In certain aspects, the first switch and the second switch are controlled by a counter integrated circuit (IC).

In certain aspects, the first time window is a same duration as the second time window.

In certain aspects, each of the first capacitor and the second capacitor is a tantalum capacitor.

Figure 6:
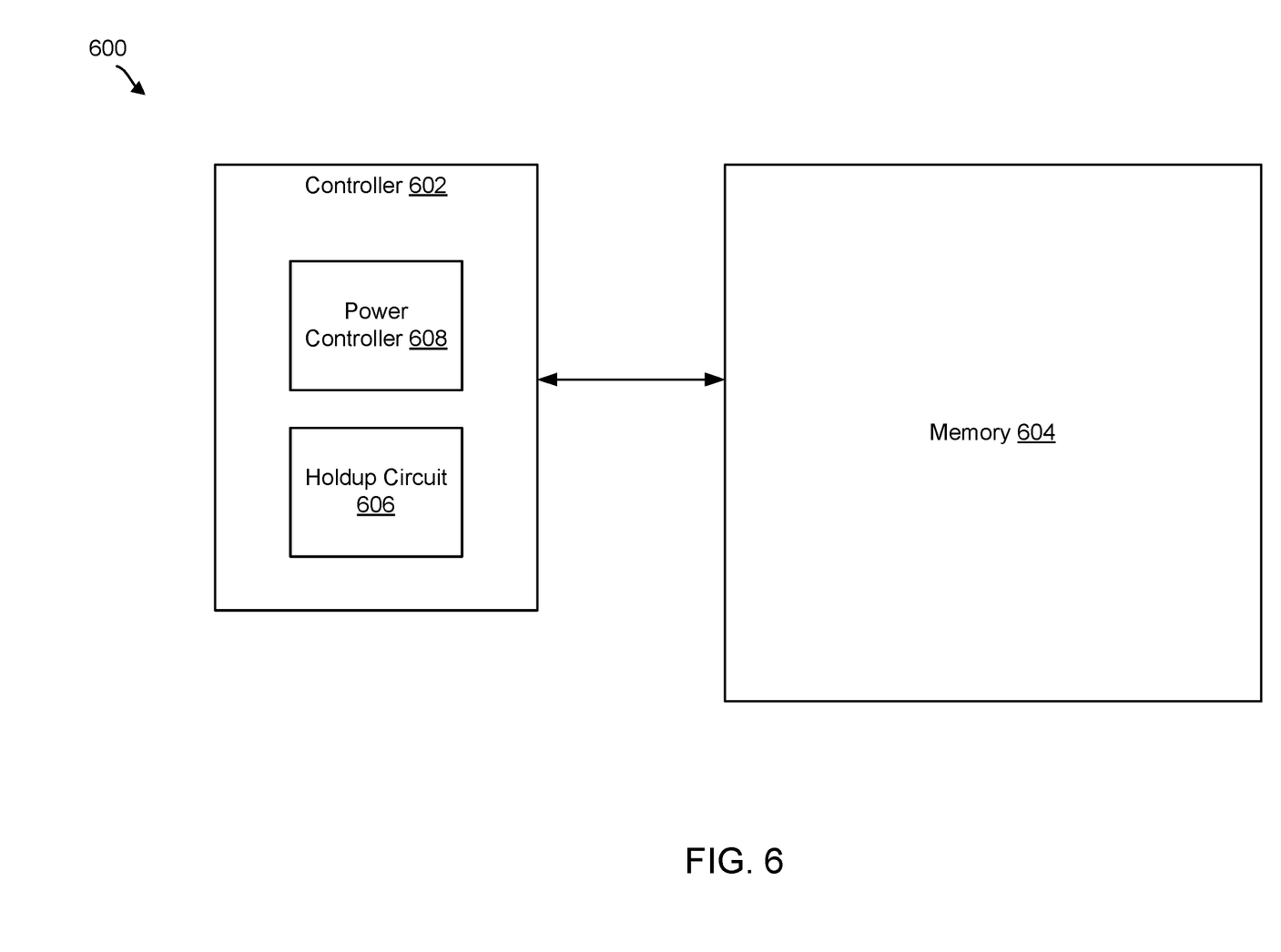
FIG. 6 is a conceptual diagram illustrating an example of a controller configured to control a holdup circuit.

FIG. 6 is a conceptual diagram illustrating an example of a controller 602 comprising a power controller 608 and a holdup circuit 606 configured to provide an auxiliary power source in the event of a power loss. The controller 602 may be part of a storage device 600 comprising a memory 604. As illustrated in FIG. 6, the controller 602 is coupled to the memory 604 (e.g., NAND) in a storage device 600. For example, controller 602 may correspond to controller 123 of FIG. 1 and memory 604 may correspond to the NVM 110 of the storage device 102 of FIG. 1. The controller 602, power controller 608, and holdup circuit 606 may be implemented in software, hardware, or a combination of hardware and software. In one exemplary embodiment, the controller 602 is implemented with several software modules executed on one or more processors, but as those skilled in the art will appreciate, the controller may be implemented in different ways. The skilled artisan will readily understand how best to implement the controller based on the particular design parameters of the system.

One or more of the holdup circuit 606, power controller 608, and controller 602 may be configured to provide the means for performing the aforementioned process described in FIG. 5.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to all types of storage devices capable of storing data. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for.

What is claimed is:

1. A holdup circuit, comprising:
   a boost converter;
   a buck converter;
   a semiconductor device configured to output a first signal and a second signal;
   a first capacitor coupled to the boost converter via a first switch; and
   a second capacitor coupled to the boost converter via a second switch, wherein the first switch is controlled by the first signal, wherein the second switch is controlled by the second signal, wherein the first signal is complementary to the second signal, wherein the buck converter is coupled to the first capacitor via a third switch and a first diode, and wherein the buck converter is coupled to the second capacitor via the third switch and a second diode.

2. The holdup circuit of claim 1, wherein the buck converter is configured to:
   receive power stored by the first capacitor and the second capacitor upon closing of the third switch;
   scale the received power; and
   provide the scaled power to a computing device.

3. The holdup circuit of claim 1, wherein the boost converter is configured to receive power from a voltage source, and wherein a loss of power from the voltage source is a triggering event configured to cause the third switch to close.

4. The holdup circuit of claim 1, wherein the semiconductor device is further configured to:
   output the first signal during a first time window, the first signal configured to close the first switch for a duration of the first time window; and
   output the second signal during a second time window, the second signal configured to close the second switch for a duration of the second time window, wherein the second time window occurs after the first time window.

5. The holdup circuit of claim 4, wherein the first time window is a same duration as the second time window.

6. The holdup circuit of claim 1, wherein the semiconductor device is an integrated circuit (IC) counter.

7. The holdup circuit of claim 1, wherein each of the first capacitor and the second capacitor is a tantalum capacitor.

8. A method for providing auxiliary power to a circuit, comprising:
   closing a first switch for a first duration of time, the first switch coupled between a boost converter and a first capacitor of a holdup capacitor bank;
   charging, via the boost converter, the first capacitor during the first duration of time;
   opening the first switch upon expiration of the first duration of time;
   closing, after opening the first switch, a second switch for a second duration of time, the second switch coupled between the boost converter and a second capacitor of the holdup capacitor bank;
   charging, via the boost converter, the second capacitor during the second duration of time; and
   closing, in response to a power failure, a third switch coupled to a buck converter, wherein the buck converter is coupled to the first capacitor via the third switch and a first diode, and wherein the buck converter is coupled to the second capacitor via the third switch and a second diode.

9. The method of claim 8, wherein:
   the second switch is open during the first duration of time, and
   the first switch is open during the second duration of time.

10. The method of claim 8, wherein the first switch and the second switch are controlled by a counter integrated circuit (IC).

11. The method of claim 8, wherein the method further comprises:
    receiving, at the buck converter, power stored by the first capacitor and the second capacitor upon closing of the third switch;
    scaling, via the buck converter, the received power; and
    provide the scaled power to the circuit.

12. The method of claim 8, wherein the first duration of time is a same duration as the second duration of time.

13. The method of claim 8, wherein each of the first capacitor and the second capacitor is a tantalum capacitor.

14. An apparatus for providing auxiliary power to a circuit, comprising:
    means for closing a first switch for a first duration of time, the first switch coupled between a boost converter and a first capacitor of a holdup capacitor bank;
    means for charging the first capacitor during the first duration of time;
    means for opening the first switch upon expiration of the first duration of time;
    means for closing, after opening the first switch, a second switch for a second duration of time, the second switch coupled between the boost converter and a second capacitor of the holdup capacitor bank;
    means for charging the second capacitor during the second duration of time; and
    means for closing, in response to a power failure, a third switch coupled to a buck converter, wherein the buck converter is coupled to the first capacitor via the third switch and a first diode, and wherein the buck converter is coupled to the second capacitor via the third switch and a second diode.

15. The apparatus of claim 14, wherein the means for closing the first switch and the means for closing the second switch comprise a counter integrated circuit (IC).

16. The apparatus of claim 14, wherein the apparatus further comprises:
    means for receiving, at the buck converter, power stored by the first capacitor and the second capacitor upon closing of the third switch;
    means for scaling the received power; and
    means for providing the scaled power to the circuit.

* * * * *